(12) United States Patent
Xing et al.

(10) Patent No.: US 9,838,907 B2
(45) Date of Patent: Dec. 5, 2017

(54) METHODS AND DEVICES FOR TRANSMITTING FRAME IN NETWORK

(71) Applicant: ZTE Corporation, Shenzhen (CN)

(72) Inventors: Weimin Xing, Shenzhen (CN); Kaiying Lv, Shenzhen (CN); Kaibo Tian, Shenzhen (CN); Nan Li, Shenzhen (CN); Jing Jiang, Shenzhen (CN); Bo Sun, Shenzhen (CN)

(73) Assignee: XI'AN ZHONGXING NEW SOFTWARE CO. LTD., Xi'an (CN)

( * ) Notice: Subject to any disclaimer, the term of this patent is extended or adjusted under 35 U.S.C. 154(b) by 537 days.

(21) Appl. No.: 14/758,327

(22) PCT Filed: Dec. 26, 2012

(86) PCT No.: PCT/CN2012/087474
§ 371 (c)(1),
(2) Date: Jun. 29, 2015

(87) PCT Pub. No.: WO2013/097711
PCT Pub. Date: Jul. 4, 2013

(65) Prior Publication Data
US 2015/0373580 A1 Dec. 24, 2015

(30) Foreign Application Priority Data
Dec. 30, 2011 (CN) .......................... 2011 1 0455572

(51) Int. Cl.
*H04W 28/06* (2009.01)
*H04W 80/02* (2009.01)
(Continued)

(52) U.S. Cl.
CPC ............. *H04W 28/06* (2013.01); *H04L 47/14* (2013.01); *H04L 69/324* (2013.01); *H04W 80/02* (2013.01)

(58) Field of Classification Search
CPC ...... H04L 47/13–47/14; H04L 69/324; H04W 28/06–28/065; H04W 80/02
See application file for complete search history.

(56) References Cited

U.S. PATENT DOCUMENTS 7,633,970 B2 * 12/2009 van Kampen ........ H04W 28/06
370/473
7,706,342 B2 * 4/2010 Yang ................. H04L 29/12839
370/338
(Continued)

FOREIGN PATENT DOCUMENTS

CN 101471924 A 7/2009
CN 101809954 A 8/2010
(Continued)

OTHER PUBLICATIONS

International Search Report for corresponding application PCT/CN2012/087474 filed Dec. 26, 2012; dated Mar. 28, 2013.

*Primary Examiner* — Timothy J Weidner
(74) *Attorney, Agent, or Firm* — Cantor Colburn LLP

(57) ABSTRACT

Provided are methods and devices for transmitting a frame in a network. The method includes: setting, by a sending station, a media access control (MAC) frame header of a MAC frame, wherein the MAC frame header includes at least one bit for indicating whether the MAC frame header adopts an optimized MAC header format, the optimized MAC frame header format referring to a MAC frame format in which only necessary frame header information is reserved (S302); sending, by the sending station, the MAC frame to a receiving station (S304). The present disclosure not only ensures correct sending and receiving of a frame, but also effectively reduces the overhead of the frame header.

12 Claims, 11 Drawing Sheets

(51) Int. Cl.
*H04L 12/801* (2013.01)
*H04L 29/08* (2006.01)

(56) References Cited

U.S. PATENT DOCUMENTS

| | | | | |
|---|---|---|---|---|
| 2011/0007755 A1* | 1/2011 | Jonsson | ................ | H04L 69/04 370/474 |
| 2011/0299443 A1 | 12/2011 | Lee et al. | | |
| 2014/0119377 A1* | 5/2014 | Crosta | ................ | H04L 45/7453 370/392 |

FOREIGN PATENT DOCUMENTS

| CN | 102237947 A | 11/2011 |
|---|---|---|
| JP | S6046023 A | 3/1985 |

\* cited by examiner

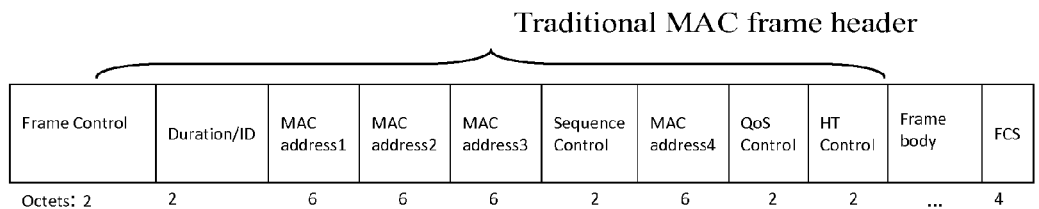

| Frame Control | Sender AID | Receiver RA | Frame body | FCS |
|---|---|---|---|---|
| Octets: 2 | 2 | 6 | ... | 4 |

| Frame Control | Receiver AID | Sender TA | Frame body | FCS |
|---|---|---|---|---|
| Octets: 2 | 2 | 6 | ... | 4 |

| Frame Control | Sender AID | Receiver RA | Other frame header parts | Frame body | FCS |
|---|---|---|---|---|---|
| Octets: 2 | 2 | 6 | ... | ... | 4 |

METHODS AND DEVICES FOR TRANSMITTING FRAME IN NETWORK

TECHNICAL FIELD

The present disclosure relates to the field of communications, including, e.g., methods and devices for transmitting a frame in a network.

BACKGROUND

At present, in the field of wireless networks, the wireless local area network (WLAN) develops rapidly, and the application range of WLAN is increasingly expanding. To cope with various network requirements, the industry specification IEEE 802.11 task force of the Institute for Electrical and Electronic Engineers promulgated a series of most general WLAN technical standards such as 802.11ah, 802.11b, 802.11g and 802.11n, and then successively set up other task forces which work toward developing specifications relating to the improvements of the existing 802.11 technology. For example, with the development of the Internet of Things, IEEE set up the 802.11ah task force of which the main task is to modify and enhance the Medium Access Control layer (MAC layer) and the physical layer (PHY layer) of WLAN in order to accommodate the requirements of networks such as the Smart Grid, the sensor network, the Environmental/Agricultural Monitoring and the Industrial Process Automation.

In a wireless local area network, one access point (AP) and multiple non-AP stations (STA) associated with this AP constitute one basic service set (BSS). Before using a service of the BSS, an STA should complete the authentication and association process with the AP. If the STA successfully associates with the AP, the AP distributes, for the STA, association identification information which is called an association identifier (AID), wherein the AID is identity identification of the STA in the present BSS, that is, the STA can be distinguished from other STAs in the present BSS via their respective AIDs, however, STAs belonging to different BSSs may use the same AID. After being connected via a distribution system (DS) simultaneously, a plurality of BSSs may constitute one ESS (extended service set). A plurality of STAs may also constitute one self-organising wireless local area network which is called an IBSS (independent BSS), wherein in the IBSS, STAs are able to perform communications directly.

When a plurality of wireless stations share a channel, conflict detection in a wireless environment becomes very difficult, and one big problem is hidden stations. For example, station A sends data to station B, and at the same time, station C also sends data to station B, since station C is located outside the coverage range of station A and stations A is located outside the coverage range of station C, A and C sending simultaneously will cause conflicts. From the viewpoint of A, C is one hidden station. To solve the problem of hidden stations, 802.11 proposes a virtual channel detection mechanism, that is, by containing channel reservation duration information in the frame header of a wireless frame, other audit stations which receive the wireless frame containing the reservation duration information set one locally stored network allocation vector (NAV), wherein the value of the NAV is configured to be the maximum value of the above-mentioned reservation duration information, during which time, the audit stations will not send data, thus avoiding hidden stations competing for a channel and causing collisions. After the NAV reduces to zero, other stations can send data. For example, a sender sends an RTS (Request to Send) frame which contains channel reservation duration information to perform channel reservation, and a receiver replies with a CTS (Clear to Send) frame which also contains channel reservation duration information to perform channel reservation acknowledgement, so as to protect wireless frames subsequently sent by the sender. It should be noted that the frame for channel reservation which is sent for the first time, for example, the above-mentioned RTS, is not under protection, that is, the channel reservation duration value carried in this frame is used for protecting subsequent frame transmission, and the initial sending frames such as the RTS still have the risk of the collisions of hidden terminals. However, since the RTS frame per se is relatively short, the probability of collision thereof is small relative to longer data frames.

In addition, the trend of development of the traditional wireless local area network is to improve the transmission rate, satisfy users' requirements for high-throughput data services, and provide the QoS of the MAC layer. Furthermore, the wireless local area network has an acknowledgement mechanism of the MAC layer, which has the characteristics of transmission sequence control and automatic retransmission.

FIG. 1 is a schematic diagram of a frame with a traditional MAC frame header according to the related art. As shown in FIG. 1, there should be a frame control field in the frame header. FIG. 2 is a schematic diagram of the frame control field according to the related art. To satisfy the above-mentioned channel duration reservation mechanism, a traditional MAC frame header should carry a Duration/ID domain. To accommodate communications under the above-mentioned multiple network structures, for example, in an ESS, if STAs belonging to different BSSs need to communicate, they have to communication through associated APs and DSs of the two parties, and thus four MAC addresses, i.e. a transmission address (TA), a source address (SA), a receiving address (RA) and a destination address (DA) are necessary, and the MAC frame header of a data frame in a wireless local area network contains at least three MAC frame headers at present. To satisfy high throughput as well as QoS control and sequence control, there is also a corresponding control field in the frame header.

In networks such as a sensor network and a smart grid network, the services thereof generally have the following characteristics: there are a large number of STAs, but the traffic between the AP and each STA is small; a report service is generally completed in such a way that the STA sends a short data packet to the AP periodically or abruptly, and the time between two data transmissions is long; there is no service transmission between the STAs, that is, the MAC layer destination address of data reported by the STA is exactly the AP, and thus the network structure is simple and not too many MAC addresses are required. A typical example is that a smart meter sends information about the amount of electricity to an AP every several hours or even several days, and after receiving a response frame replied by the AP, the smart meter may not send data any more for a very long time. Since a data frame per se is very small in size, using a protection frame (RTS/CTS) to reserve a channel instead will increase the overhead. If the transmission does not require multiple frame exchanges, the reservation duration in the data frame is set to be one interframe space (IFS) and the transmission time of one response frame; and since there is no immediately subsequent transmission, no more duration needs to be reserved. This response to the data frame is immediate response, since it is unnecessary to transmit multiple frames successively, and functions such as link self-adaptation needs not to be used. Since the service of this network is relatively simple, even the sequence control and QoS control are unnecessary.

In a new application scenario of the wireless local area network, in a network such as a sensor network, the length of a data packet is generally 100-200 bytes. According to the existing protocols of the wireless local area network, during the transmission of short frames, the ratio of the overhead such as a physical layer frame header, a MAC frame header and a MAC acknowledgement mechanism to the data part is very large; therefore, it is proposed as one research subject in relevant WLAN task forces to reduce the overhead of the protocol, and there is no ideal solution in the related technologies temporarily.

SUMMARY

Provided in the present disclosure are methods and devices for transmitting a frame in a network, so as to at least solve the problem of the increasing in the frame overhead when a MAC frame header contains all the frame header information in the related technologies.

According to one aspect of the embodiments of the present disclosure, provided is a method for transmitting a frame in a network, including: setting, by a sending station, a MAC frame header of a MAC frame, wherein the MAC frame header includes at least one bit for indicating whether the MAC frame header adopts an optimized MAC frame header format, the optimized MAC frame header format referring to a MAC frame header format in which only necessary frame header information is reserved; and sending, by the sending station, the MAC frame to a receiving station.

In an example embodiment, setting, by the sending station, the MAC frame header of the MAC frame includes: in a case where the at least one bit is a local network identity identification/reservation duration field in the MAC frame header, setting a value of the at least one bit to be within a value interval of local network identity identification, wherein the local network identity identification/reservation duration field is used for indicating local network identity identification information about one station in the optimized MAC frame header format and is used for indicating information about one reservation duration in a non-optimized MAC frame header format, and the value interval of the local network identity identification does not overlap with a value interval of the reservation duration information in the local network identity identification/reservation duration field.

In an example embodiment, setting the value of the at least one bit to be within the value interval of the local network identity identification includes: setting the value of the at least one bit to be the local network identity identification of the sending station of the MAC frame, and using one unique address identification information field to indicate a MAC address of the receiving station of the MAC frame.

In an example embodiment, setting the value of the at least one bit to be within the value interval of the local network identity identification includes: setting the value of the at least one bit to be the local network identity identification of the receiving station of the MAC frame, and using one unique address identification information field to indicate a MAC address of the sending station of the MAC frame.

In an example embodiment, setting, by the sending station, the MAC frame header of the MAC frame includes: in a case where the at least one bit is a frame type and/or frame sub-type in the MAC frame header, setting the value of the at least one bit to be a preset value for indicating that the MAC frame header adopts the optimized MAC frame header format and setting a value of a local network identity identification/reservation duration field in the MAC frame header to be within a value interval of local network identity identification, wherein the local network identity identification/reservation duration field is used for indicating local network identity identification information about one station in the optimized MAC frame header format and is used for indicating information about one reservation duration in a non-optimized MAC frame header format, the value interval of the local network identity identification does not overlap with a value interval of the reservation duration information in the local network identity identification/reservation duration field.

In an example embodiment, setting the value of the local network identity identification/reservation duration field in the MAC frame header to be within the value interval of the local network identity identification includes: setting the value of the local network identity identification/reservation duration field in the MAC frame header to be the local network identity identification of the sending station of the MAC frame, and using one unique address identification information field to indicate a MAC address of the receiving station of the MAC frame.

In an example embodiment, setting the value of the local network identity identification/reservation duration field in the MAC frame header to be within the value interval of the local network identity identification includes: setting the value of the local network identity identification/reservation duration field in the MAC frame header to be the local network identity identification of the receiving station of the MAC frame, and using one unique address identification information field to indicate a MAC address of the sending station of the MAC frame.

According to one aspect of the present disclosure, further provided is a method for transmitting a frame in a network, including: receiving, by a receiving station, a MAC frame from a sending station, wherein a MAC frame header of the MAC frame includes at least one bit for indicating whether the MAC frame header adopts an optimized MAC frame header format, the optimized MAC frame header format referring to a MAC frame header format in which only necessary frame header information is reserved; and determining, by the receiving station, that the MAC frame header adopts the optimized MAC frame header format according to the at least one bit.

In an example embodiment, after determining, by the receiving station, that the MAC frame header adopts the optimized MAC frame header format according to the at least one bit, the method further includes: in a case where a value of a local network identity identification/reservation duration field in the MAC frame header is local network identity identification of the sending station of the MAC frame and one unique address identification information field is used to indicate a MAC address of the receiving station of the MAC frame, determining, by the receiving station, that a MAC address of the receiving station is inconsistent with the MAC address of the receiving station of the MAC frame indicated by the unique address identification information field; determining, by the receiving station, that a time length of one interframe space plus a transmission time of one acknowledgement frame is greater than a value of a network allocation vector having been set by the receiving station; and updating, by the receiving station, the value of the network allocation vector in accordance with the time length of one interframe space plus the transmission time of one acknowledgement frame.

According to another aspect of the present disclosure, provided is a device for transmitting a frame in a network, including: a setting component configured to set a MAC frame header of a MAC frame, wherein the MAC frame header includes at least one bit for indicating whether the MAC frame header adopts an optimized MAC frame header format, the optimized MAC frame header format referring to a MAC frame header format in which only necessary frame header information is reserved; and a sending component configured to send the MAC frame to a receiving station.

In an example embodiment, the setting component includes: a first setting sub-component configured to set, in a case where the at least one bit is a local network identity identification/reservation duration field in the MAC frame header, a value of the at least one bit to be within a value interval of the local network identity identification, wherein the local network identity identification/reservation duration field is used for indicating local network identity identification information about one station in the optimized MAC frame header format and is used for indicating information about one reservation duration in a non-optimized MAC frame header format, and the value interval of the local network identity identification does not overlap with a value interval of the reservation duration information in the local network identity identification/reservation duration field.

In an example embodiment, the setting component further includes: a second setting sub-component configured to set, in a case where the at least one bit is a frame type and/or frame sub-type in the MAC frame header, the value of the at least one bit to be a preset value for indicating that the MAC frame header adopts the optimized MAC frame header format and set a value of the local network identity identification/reservation duration field in the MAC frame header to be within a value interval of local network identity identification, wherein the local network identity identification/reservation duration field is used for indicating local network identity identification information about one station in the optimized MAC frame header format and is used for indicating information about one reservation duration in a non-optimized MAC frame header format, the value interval of the local network identity identification does not overlap with a value interval of the reservation duration information in the local network identity identification/reservation duration field.

According to another aspect of the present disclosure, further provided is a device for transmitting a frame in a network, including: a receiving component configured to receive a MAC frame from a sending station, wherein a MAC frame header of the MAC frame includes at least one bit for indicating whether the MAC frame header adopts an optimized MAC frame header format, the optimized MAC frame header format referring to a MAC frame header format in which only necessary frame header information is reserved; and a first determination component configured to determine that the MAC frame header adopts the optimized MAC frame header format according to the at least one bit.

In an example embodiment, the above-mentioned device further includes: a second determination component configured to determine, in a case where a value of a local network identity identification/reservation duration field in the MAC frame header is local network identity identification of the sending station of the MAC frame and one unique address identification information field is used to indicate a MAC address of the receiving station of the MAC frame, that a MAC address of the receiving station is inconsistent with the MAC address of the receiving station of the MAC frame indicated by the unique address identification information field; a third determination component configured to determine that a time length of one interframe space plus a transmission time of one acknowledgement frame is greater than a value of a network allocation vector having been set by the receiving station; and a first updating component configured to update the value of the network allocation vector in accordance with the time length of one interframe space plus the transmission time of one acknowledgement frame.

In an example embodiment, the above-mentioned device further includes: a fourth determination component configured to determine, in a case where a value of a local network identity identification/reservation duration field in the MAC frame header is local network identity identification of the receiving station of the MAC frame and one unique address identification information field is used to indicate a MAC address of the sending station of the MAC frame, that local network identity identification corresponding to a MAC address of the receiving station is inconsistent with the value of the local network identity identification/reservation duration field in the MAC frame header; a fifth determination component configured to determine that a time length of one interframe space plus a transmission time of one acknowledgement frame is greater than a value of a network allocation vector having been set by the receiving station; and a second updating component configured to update the value of the network allocation vector in accordance with the time length of one interframe space plus the transmission time of one acknowledgement frame.

According to another aspect of the present disclosure, further provided is a method for transmitting a frame in a network, including: setting, by a sending station, a MAC frame header of a MAC frame, wherein the MAC frame header includes at least one bit for indicating whether the MAC frame header adopts an optimized MAC frame header format, the optimized MAC frame header format referring to a compressed MAC frame header format; and sending, by the sending station, the MAC frame to a receiving station.

According to another aspect of the present disclosure, further provided is a method for transmitting a frame in a network, including: receiving, by a receiving station, a MAC frame from a sending station, wherein a MAC frame header of the MAC frame includes at least one bit for indicating whether the MAC frame header adopts an optimized MAC frame header format, the optimized MAC frame header format referring to a compressed MAC frame header format; and determining, by the receiving station, that the MAC frame header adopts the optimized MAC frame header format according to the at least one bit.

According to another aspect of the present disclosure, further provided is a device for transmitting a frame in a network, including: a setting component configured to set a MAC frame header of a MAC frame, wherein the MAC frame header includes at least one bit for indicating whether the MAC frame header adopts an optimized MAC frame header format, the optimized MAC frame header format referring to a compressed MAC frame header format; and a sending component configured to send the MAC frame to a receiving station.

According to another aspect of the present disclosure, further provided is a device for transmitting a frame in a network, including: a receiving component configured to receive a MAC frame from a sending station, wherein a MAC frame header of the MAC frame includes at least one bit for indicating whether the MAC frame header adopts an optimized MAC frame header format, the optimized MAC frame header format being a compressed MAC frame header format; and a first determination component configured to determine that the MAC frame header adopts the optimized MAC frame header format according to the at least one bit.

By means of the present disclosure, a frame header may adopt a compressed MAC frame header, for example, the frame header may adopt an optimized MAC frame header in which only necessary frame header information is reserved, and this not only can ensure the correct receiving and sending of the frame but also can effectively reduce the frame overhead.

BRIEF DESCRIPTION OF THE DRAWINGS

Drawings, provided for further understanding of the disclosure and forming a part of the specification, are used to explain the disclosure together with embodiments of the disclosure rather than to limit the disclosure. In the drawings:

FIG. 1 is a schematic diagram of a frame with a traditional MAC frame header according to the related art;

FIG. 2 is a schematic diagram of a frame control field according to the related art;

FIG. 3 is flowchart one of a method for transmitting a frame in a network according to an embodiment of the present disclosure;

DETAILED DESCRIPTION OF THE EMBODIMENTS

Figure 4:
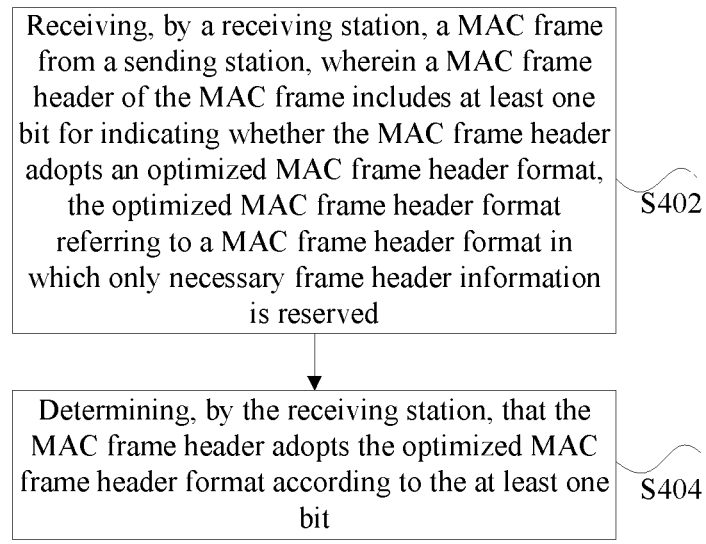
FIG. 4 is flowchart two of a method for transmitting a frame in a network according to an embodiment of the present disclosure.

Note that, the embodiments of the disclosure and the features of the embodiments can be combined with each other if there is no conflict. The disclosure will be explained below with reference to the drawings and in conjunction with the embodiments in detail.

In one embodiment of the present disclosure, provided is a method for sending a frame in a network. FIG. 3 is flowchart one of a method for transmitting a frame in a network according to an embodiment of the present disclosure. The method includes the following step S302 to step S304.

Step S302, a sending station sets a MAC frame header of a MAC frame, wherein the MAC frame header includes at least one bit for indicating whether the MAC frame header adopts an optimized MAC frame header format, the optimized MAC frame header format referring to a MAC frame header format in which only necessary frame header information is reserved.

Step S304, the sending station sends the MAC frame to a receiving station.

In the related technologies, an MAC frame header containing all the frame header information is adopted, and in this way, the frame overhead is increased, especially for a data frame which is small in size. In the embodiment of the present disclosure, an optimized MAC frame header in which only necessary frame header information is reserved can be adopted, and this not only can ensure the correct receiving and sending of the frame but also can effectively reduce the frame overhead.

In one embodiment of the present disclosure, further provided are two ways in which whether an MAC frame header adopts an optimized MAC frame header format is indicated by means of at least one bit. A more detailed description will be made below.

Indication way one: indication is performed by means of a local network identity identification/reservation duration field in the MAC frame header, wherein the local network identity identification/reservation duration field is used for indicating local network identity identification information about one station in the optimized MAC frame header format and is used for indicating information about one reservation duration in a non-optimized MAC frame header format, and a value interval of the local network identity identification does not overlap with a value interval of the reservation duration information in the local network identity identification/reservation duration field.

It should be noted that, in a case where the MAC frame header adopts the optimized MAC frame header format, it is just unnecessary to utilize the local network identity identification/reservation duration field to send the reservation duration length. Therefore, in the present example embodiment, the local network identity identification/reservation duration field is made full use of and the value of the at least one bit is set to be within a value interval of the local network identity identification to indicate that the MAC frame header adopts the optimized MAC frame header format. In this way, it is not necessary to add new fields, and the frame overhead can be reduced.

In an example embodiment, the value of the at least one bit may also be set to be the local network identity identification of the sending station of the MAC frame, and one unique address identification information field may be used to indicate a MAC address of the receiving station of the MAC frame. Alternatively, the value of the at least one bit may be set to be the local network identity identification of the receiving station of the MAC frame, and one unique address identification information field is used to indicate the MAC address of the sending station of the MAC frame. In the present example embodiment, the local network identity identification/reservation duration field is further utilized to indicate the local network identity identification of the sending station or receiving station. In this way, it is not necessary to add new fields to perform indication, and the frame overhead is reduced.

It should be noted that, in a case where the value of the at least one bit is the local network identity identification of the sending station of the MAC frame, considering that the sending station (for example, an AP) itself does not have local network identity identification, the AP in the embodiment of the present disclosure also needs to be configured with one default value or particular value as its own local network identity identification.

Indication way two: indication is performed by means of a frame type and/or frame sub-type in the MAC frame header. It should be noted that the value of the at least one bit should be set to be a preset value for indicating that the MAC frame header adopts the optimized MAC frame header format and the value of the local network identity identification/reservation duration field in the MAC frame header should be set to be within a value interval of local network identity identification, wherein the local network identity identification/reservation duration field is used for indicating local network identity identification information about one station in the optimized MAC frame header format and is used for indicating information about one reservation duration in a non-optimized MAC frame header format, the value interval of the local network identity identification does not overlap with a value interval of the reservation duration information in the local network identity identification/reservation duration field.

In an example embodiment, setting the value of the local network identity identification/reservation duration field in the MAC frame header to be within the value interval of the local network identity identification includes: setting the value of the local network identity identification/reservation duration field in the MAC frame header to be the local network identity identification of the sending station of the MAC frame, and using one unique address identification information field to indicate the MAC address of the receiving station of the MAC frame.

In an example embodiment, setting the value of the local network identity identification/reservation duration field in the MAC frame header to be within the value interval of the local network identity identification includes: setting the value of the local network identity identification/reservation duration field in the MAC frame header to be the local network identity identification of the receiving station of the MAC frame, and using one unique address identification information field to indicate the MAC address of the sending station of the MAC frame.

Figure 19:
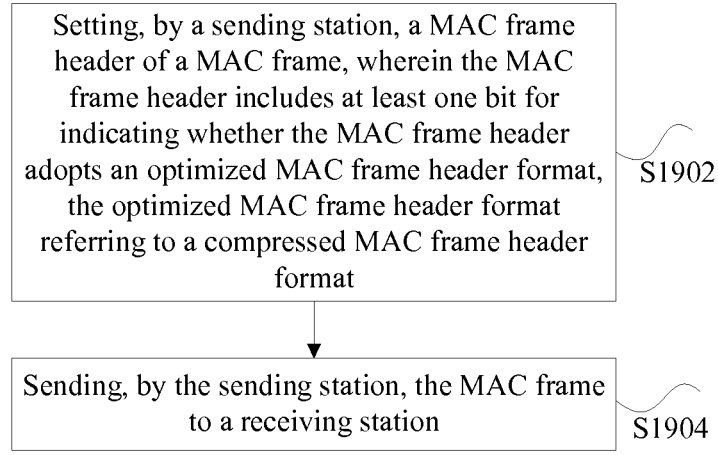
FIG. 19 is flowchart three of a method for transmitting a frame in a network according to an embodiment of the present disclosure.

In another embodiment of the present disclosure, provided is a method for transmitting a frame in a network. FIG. 19 is flowchart three of the method for transmitting a frame in a network according to an embodiment of the present disclosure. The method includes the following step S1902 to step S1904.

Step S1902, a sending station sets a MAC frame header of a MAC frame, wherein the MAC frame header includes at least one bit for indicating whether the MAC frame header adopts an optimized MAC frame header format, the optimized MAC frame header format referring to a compressed MAC frame header format.

Step S1904, the sending station sends the MAC frame to a receiving station.

In the related technologies, an MAC frame header containing all the frame header information is adopted, and in this way, the frame overhead is increased, especially for a data frame which is small in size. In the embodiment of the present disclosure, a compressed MAC frame header format can be adopted so as to effectively reduce the frame overhead.

In this method, with regard to how to compress the MAC frame header format, the way in which only necessary frame header information is reserved in the MAC frame header described in the aforementioned embodiment may be adopted to construct the optimized MAC frame header. Other strategies may also be adopted to compress the MAC frame header, for example, setting according to a pre-agreed or pre-negotiated MAC frame header format (the length of which is less than that of a traditional MAC frame header), etc. In the case where the method adopts the way in which only necessary frame header information is reserved to construct the optimized MAC frame header, the principle is the same as that of the aforementioned embodiment, and reference is made to the description in the aforementioned embodiment for the specific processing modes, and the details are not described here again.

In addition, in this method, reference may also be made to relevant descriptions in the aforementioned embodiment for the way in which whether a MAC frame header adopts an optimized MAC frame header format is indicated by means of at least one bit, and the details are not described here again.

FIG. 4 is flowchart two of a method for transmitting a frame in a network according to an embodiment of the present disclosure. The method includes the following step S402 to step S404.

Step S402, a receiving station receives a MAC frame from a sending station, wherein a MAC frame header of the MAC frame includes at least one bit for indicating whether the MAC frame header adopts an optimized MAC frame header format, the optimized MAC frame header format referring to a MAC frame header format in which only necessary frame header information is reserved.

Step S404, the receiving station determines that the MAC frame header adopts the optimized MAC frame header format according to the at least one bit.

In the related technologies, an MAC frame header containing all the frame header information is adopted, and in this way, the frame overhead is increased, especially for a data frame which is small in size. In the embodiment of the present disclosure, an optimized MAC frame header in which only necessary frame header information is reserved can be adopted, and this not only can ensure the correct receiving and sending of the frame but also can effectively reduce the frame overhead.

In an example embodiment, after determining, by the receiving station, that the MAC frame header adopts the optimized MAC frame header format according to the at least one bit, the method further includes: in a case where a value of a local network identity identification/reservation duration field in the MAC frame header is local network identity identification of the sending station of the MAC frame and one unique address identification information field is used to indicate a MAC address of the receiving station of the MAC frame, determining, by the receiving station, that a MAC address of the receiving station is inconsistent with the MAC address of the receiving station of the MAC frame indicated by the unique address identification information field; determining, by the receiving station, that a time length of one interframe space plus a transmission time of one acknowledgement frame is greater than a value of a network allocation vector having been set by the receiving station; and updating, by the receiving station, the value of the network allocation vector in accordance with the time length of one interframe space plus the transmission time of one acknowledgement frame. In the present example embodiment, updating the value of the network allocation vector in accordance with the time length of one interframe space plus the transmission time of one acknowledgement frame can avoid the receiving station from being affected by the other receiving stations.

Figure 20:
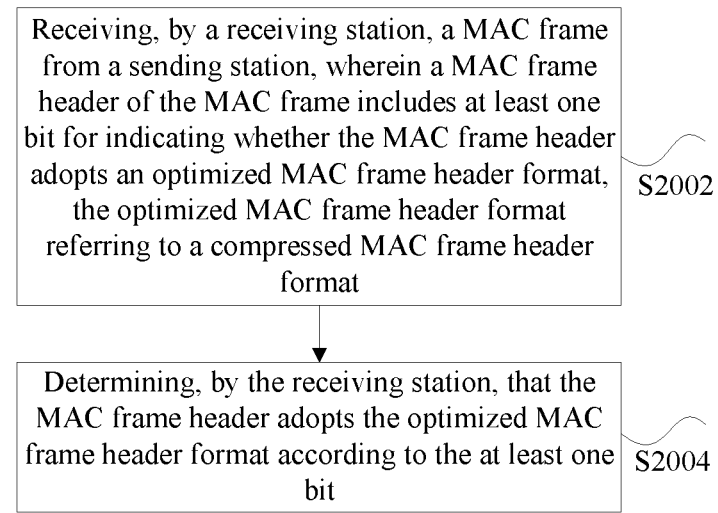
FIG. 20 is flowchart four of a method for transmitting a frame in a network according to an embodiment of the present disclosure.

FIG. 20 is flowchart four of a method for transmitting a frame in a network according to an embodiment of the present disclosure. The method includes the following step S2002 to step S2004.

Step S2002, a receiving station receives a MAC frame from a sending station, wherein a MAC frame header of the MAC frame includes at least one bit for indicating whether the MAC frame header adopts an optimized MAC frame header format, the optimized MAC frame header format referring to a compressed MAC frame header format.

Step S2004, the receiving station determines that the MAC frame header adopts the optimized MAC frame header format according to the at least one bit.

In the related technologies, an MAC frame header containing all the frame header information is adopted, and in this way, the frame overhead is increased, especially for a data frame which is small in size. In the embodiment of the present disclosure, a compressed MAC frame header format can be adopted so as to effectively reduce the frame overhead.

In this method, with regard to the compressed MAC frame header format, it may be an optimized MAC frame header constructed in the way in which only necessary frame header information is reserved in the MAC frame header described in the aforementioned embodiment, and it may also be a compressed MAC frame header constructed adopting other strategies, for example, a MAC frame header constructed according to a pre-agreed or pre-negotiated MAC frame header format (the length of which is less than that of a traditional MAC frame header), etc.

In an example embodiment, after determining, by the receiving station, that the MAC frame header adopts the optimized MAC frame header format according to the at least one bit, the method further includes: in a case where a value of a local network identity identification/reservation duration field in the MAC frame header is local network identity identification of the sending station of the MAC frame and one unique address identification information field is used to indicate a MAC address of the receiving station of the MAC frame, determining, by the receiving station, that a MAC address of the receiving station is inconsistent with the MAC address of the receiving station of the MAC frame indicated by the unique address identification information field; determining, by the receiving station, that a time length of one interframe space plus a transmission time of one acknowledgement frame is greater than a value of a network allocation vector having been set by the receiving station; and updating, by the receiving station, the value of the network allocation vector in accordance with the time length of one interframe space plus the transmission time of one acknowledgement frame. In the present example embodiment, updating the value of the network allocation vector in accordance with the time length of one interframe space plus the transmission time of one acknowledgement frame can avoid the receiving station from being affected by the other receiving stations.

The implementation process of the embodiments of the present disclosure is described in details with reference to the embodiments below.

Embodiment One

There is one AP and several associated STAs in one BSS. During the association process, the AP distributes a unique local network identification in the BSS for each STA, and the AP uses one default value as its own local network identification, the value being notified to the STAs by the AP, or the value being a default value known to the STAs in advance. The network supports both the optimized MAC frame header format and the traditional MAC frame header format. Both STA1 and STA2 have services to be communicated with the AP, and the stations compete for a channel according to parameters specified by the network. It is assumed that the service of STA1 is suitable for the use of the optimized MAC frame header, and the service of the STA2 still uses a traditional MAC frame header. The communication process is described as follows.

Table 1 is data table one of an optimized frame header. The service of STA1 is a service similar to the report of a sensor network or reading meter in a smart meter network, etc. In the service, one data packet is sent from the STA to the AP, and after the STA receives a response frame replied by the AP, this communication successfully ends.

TABLE 1

Data table one of the optimized frame header

| Bit 0-bit 13 | Bit 14 | Bit 15 | Definition |
|---|---|---|---|
| 0-32767 |   | 0 | duration |
| 0 | 0 | 1 | a fixed duration value during PCF |
| 1-16383 | 0 | 1 | reserved |
| 0 | 1 | 1 | reserved |
| 1-16383 | 1 | 1 | AID in the optimized MAC frame header |

Figure 5:
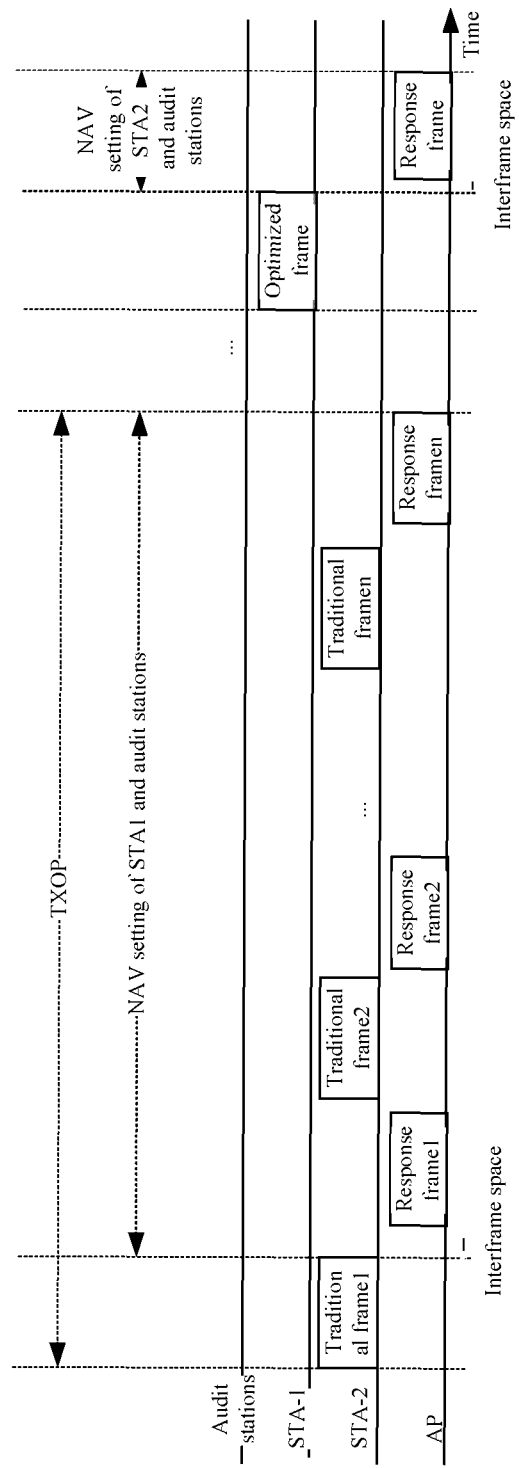
FIG. 5 is a schematic diagram of the setting of a local network identity identification/reservation duration field in the design of a frame header according to an embodiment of the present disclosure.

Table 2 is data table two of the optimized frame header. Assuming that STA2 firstly acquires an opportunity through competition to send data, STA2 can complete the service by performing several wireless frame exchanges with the AP, and STA2 selects to use a traditional MAC frame header. The frame format is as shown in FIG. 1. The value in a Duration/ID domain is set to be one value representing the time length (Duration), the time length being a channel time reserved by STA2 in advance in order to protect the frame exchange with the AP from interferences. In addition, the frame header also includes a sender MAC address (TA), a receiver MAC address (RA), other MAC addresses, a sequence control field, a QoS control field and a high-throughput control field. When STA1 and other audit stations have received the above-mentioned wireless frame, the MAC frame header format used by this frame is judged according to the value of the Duration/ID domain. FIG. 5 is a schematic diagram of the setting of a local network identity identification/reservation duration field in the design of a frame header according to an embodiment of the present disclosure. As shown in FIG. 5, when the value of the domain indicates a Duration value, it represents that the frame adopts a traditional MAC frame header. After judging that the frame is irrelevant to itself according to the RA, STA1 and other audit stations should update a local NAV according to the Duration carried in the frame header. Before the NAV turns to zero, STA1 and other audit stations cannot try to access the channel.

TABLE 2 is data table two of the optimized frame header

| Bit 0-bit 13 | Bit 14 | Bit 15 | Definition |
| --- | --- | --- | --- |
| 0-32767 | | 0 | duration |
| 0 | 0 | 1 | a fixed duration value during PCF |
| 1-16383 | 0 | 1 | AID in the optimized MAC frame header |
| 0 | 1 | 1 | reserved |
| 1-16383 | 1 | 1 | AID in a traditional PS-Poll frame |

Figure 6:
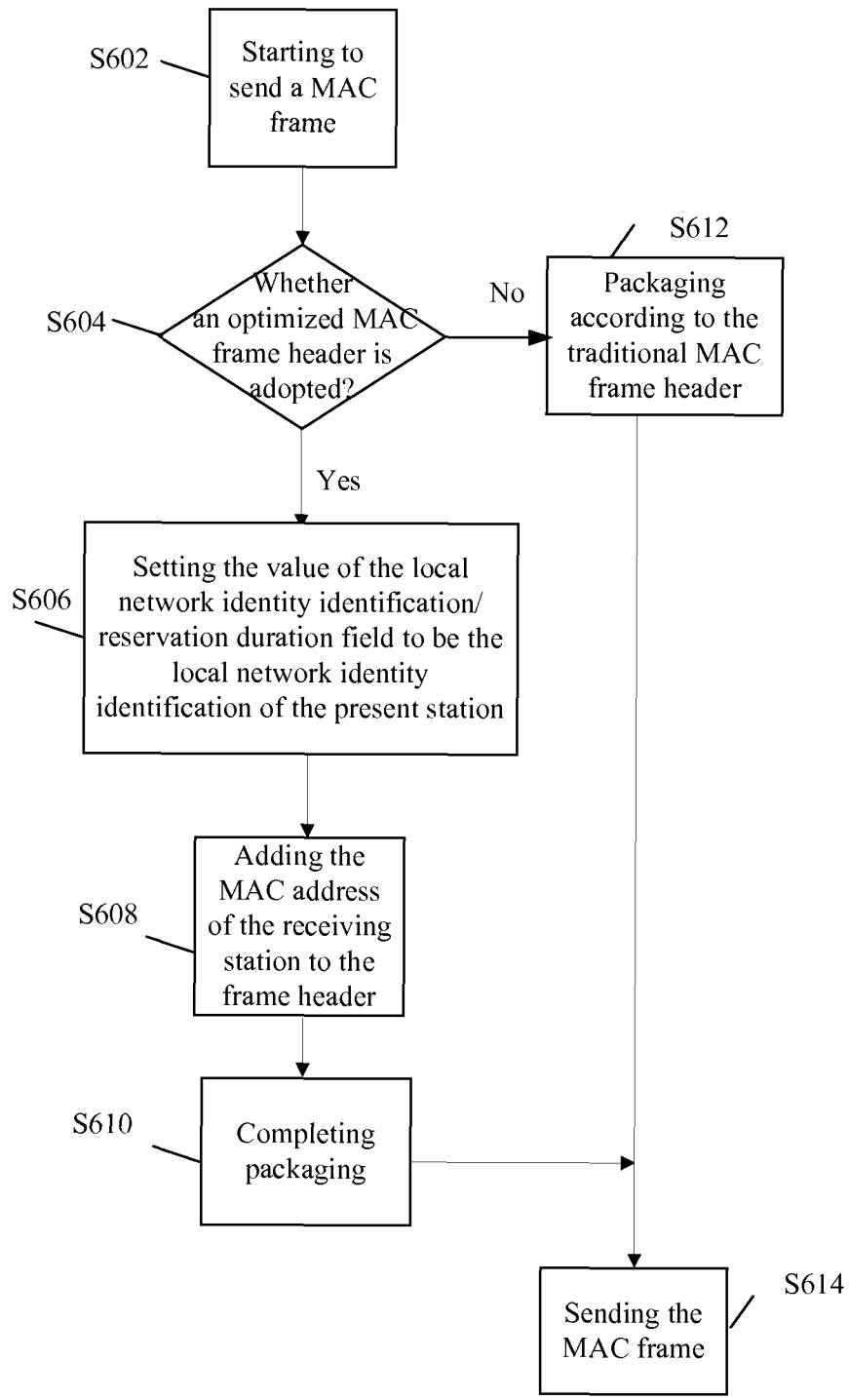
FIG. 6 is schematic flowchart one of a receiving and sending method in a wireless network according to an embodiment of the present disclosure.

After STA2 completes service transmission, if the local NAV of STA1 changes to zero, then STA1 continues to compete for the channel. It is assumed that STA1 succeeds in the acquisition of an opportunity to access the channel and STA1 selects to use an optimized MAC frame header format according to its own service characteristics, the frame format being as shown in FIG. 1. The Duration/ID domain is set to be a local network identification value of the sender STA1, and the frame header further includes the MAC address of the receiver (AP). STA2 and other audit stations, when having monitored the frame, judge that the frame is a frame using an optimized MAC frame header according to the value of Duration/ID. After judging that the frame is irrelevant to itself according to RA, STA2 and other audit stations should update the local NAV with the length of the interframe space plus the transmission time of one response frame (only when the existing value of NAV is less than the length of the interframe space plus the transmission time of one response frame). When receiving the frame, the AP judges that the frame is a frame using an optimized MAC frame header according to the value of Duration/ID, judges that the AP itself is the destination address according to RA, uniquely determines the address of the sender according to the local network identification of the sender carried in the frame and the local network identification distributed during the association process, and replies with a response frame after one interframe space since the frame have been received. FIG. 6 is schematic flowchart one of a receiving and sending method in a wireless network according to an embodiment of the present disclosure. As shown in FIG. 6, the method includes the following step S602 to step S614.

Step S602, starting to send a MAC frame.

Step S604, judging whether an optimized MAC frame header is adopted. If so, executing step S606; and if not, executing step S612.

Step S606, setting the value of the local network identity identification/reservation duration field to be the local network identity identification of the present station.

Step S608, adding the MAC address of the receiving station to the frame header.

Step S610, completing packaging.

Step S612, packaging according to the traditional MAC frame header.

Step S614, sending the MAC frame.

Figure 7:
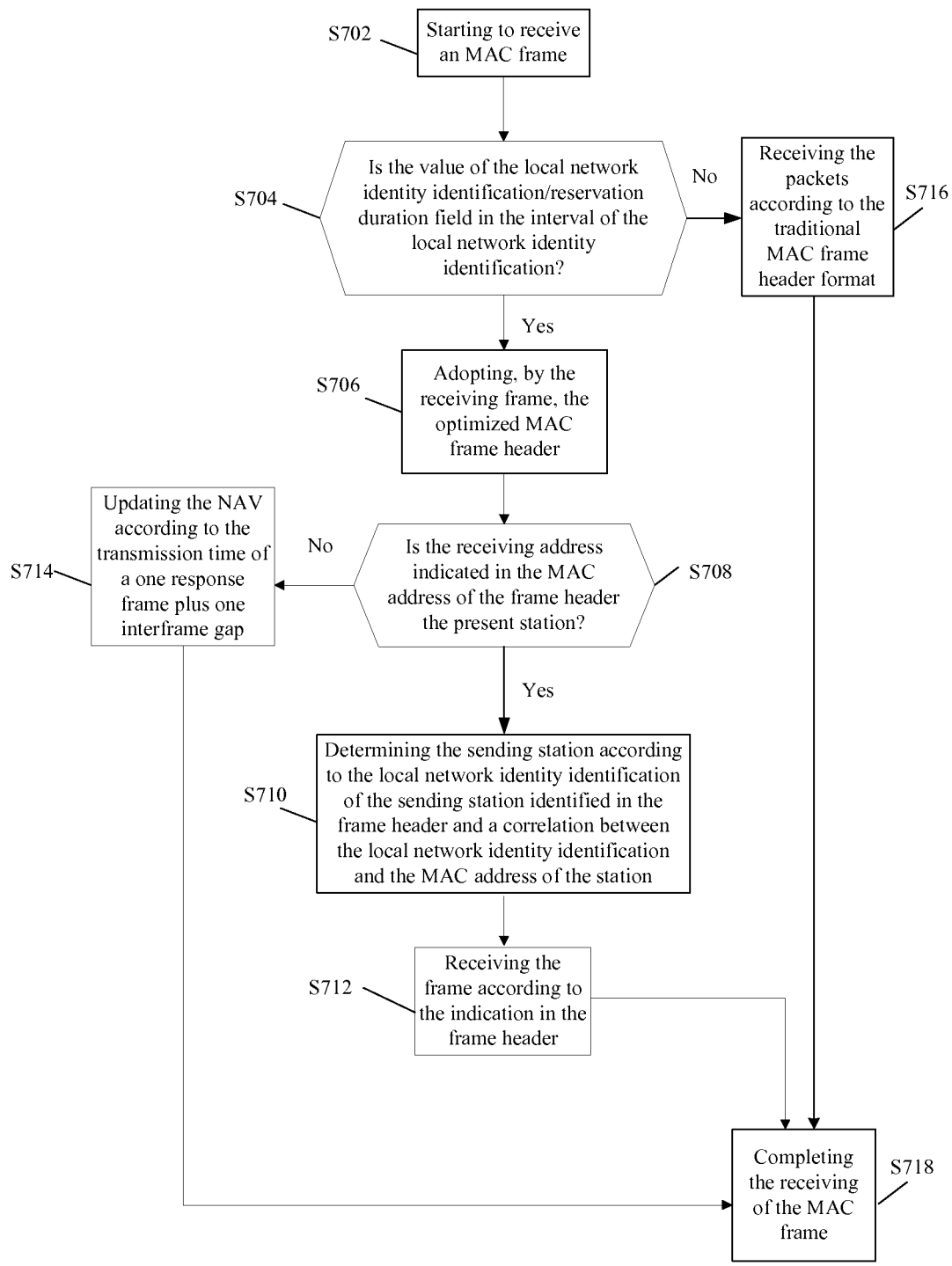
FIG. 7 is schematic flowchart two of a receiving and sending method in a wireless network according to an embodiment of the present disclosure.

FIG. 7 is schematic flowchart two of a receiving and sending method in a wireless network according to an embodiment of the present disclosure. As shown in FIG. 7, the method includes the following step S702 to step S718.

Step S702, starting to receive the MAC frame.

Step S704, judging whether the value of the local network identity identification/reservation duration field is within the value interval of the local network identity identification. If so, executing step S706; and if not, executing step S716.

Step S706, adopting the optimized MAC frame header for the receiving frame.

Step S708, judging whether the receiving address indicated in the MAC address of the frame header is that of the present station. If so, executing step S710; and if not, executing step S714.

Step S710, determining the sending station according to the local network identity identification of the sending station identified in the frame header and a correlation between the local network identity identification and the MAC address of the station.

Step S712, receiving the frame according to the indication in the frame header.

Step S714, updating the NAV according to the transmission time of one response frame plus one interframe space.

Step S716, receiving the packet according to the traditional MAC frame header format.

Step S718, completing the receiving of the MAC frame.

Embodiment Two

The present embodiment is an example directed to the indication in the MAC frame header used in the solutions of the present disclosure.

When using an optimized MAC frame header, a Type and Subtype sub-domains in a frame control field in FIG. 2 are set to be a particular value, wherein the value represents that the format of the frame should be understood according to the form of an optimized MAC header. When the value of the sub-domains is set to be a defined value of the wireless local area network, it represents that the format of the frame adopts a defined traditional frame header format.

Taking the local network identification (AID) as an example, when the value interval is within a local network identification interval in an optimized MAC frame header, it represents that the frame is one frame adopting an optimized MAC frame header, and the other values represent that the frame is one frame adopting a traditional MAC frame header.

Embodiment Three

The present embodiment is an example directed to the frame structure using an optimized MAC frame header in the solutions of the present disclosure, wherein an AID is taken as an example of local network identification, and a MAC address is taken as an example of global unique address information.

Figures 8, 9, 10, 11:
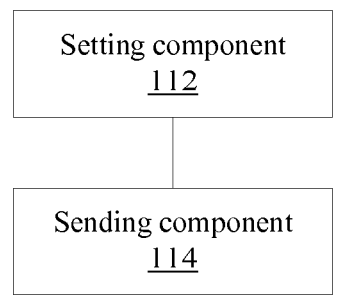
FIG. 8 is schematic diagram one of a frame adopting an optimized MAC frame header format according to an embodiment of the present disclosure.
FIG. 9 is schematic diagram two of a frame adopting an optimized MAC frame header format according to an embodiment of the present disclosure.
FIG. 10 is schematic diagram three of a frame adopting an optimized MAC frame header format according to an embodiment of the present disclosure.
FIG. 11 is structural block diagram one of a device for transmitting a frame in a network according to an embodiment of the present disclosure.

FIG. 8 is schematic diagram one of a frame adopting an optimized MAC frame header format according to an embodiment of the present disclosure. As shown in FIG. 8, From/To DS are both set to be zero in Frame Control of FIG. 2, and what locates after the Frame Control is the AID identifying the sender and the RA identifying the MAC address of the receiver, followed by a frame body data and check field.

FIG. 9 is schematic diagram two of a frame adopting an optimized MAC frame header format according to an embodiment of the present disclosure. As shown in FIG. 9, From/To DS are both set to be zero in Frame Control of FIG. 2, and what locates after the Frame Control is the AID identifying the receiver and the TA identifying the MAC address of the sender, followed by a frame body data and check field.

FIG. 10 is schematic diagram three of a frame adopting an optimized MAC frame header format according to an embodiment of the present disclosure. As shown in FIG. 10, From/To DS are both set to be zero in Frame Control of FIG. 2, and what locates after the Frame Control is the AID identifying the receiver and the TA identifying the MAC address of the sender, followed by some fields in the traditional frame header of FIG. 1, and then followed by a frame body data and check field.

It should be noted that FIGS. 8-10 only illustrate the using of the AID and the MAC address to identify the two stations conducting communications, and the sequence of the two information domains in the frame actually transmitted may be exchanged, and the From/To DS being set to be other values may also be applied to the present method.

It should be noted that steps illustrated in the flowcharts of the drawings can be executed in a computer system such as a set of computer-executable instructions; in addition, although logic sequences are illustrated in the flowcharts, in some cases, the illustrated or described steps can be executed in a sequence different than those provided here.

A device for transmitting a frame in a network is provided in the embodiment of the present disclosure. The device may be used for implementing the above-mentioned method for transmitting a frame in a network. FIG. 11 is structural block diagram one of the device for transmitting a frame in a network according to an embodiment of the present disclosure. As shown in FIG. 11, the device includes a setting component 112 and a sending component 114. The structure thereof is described in details below.

The setting component 112 is configured to set a MAC frame header of a MAC frame, wherein the MAC frame header includes at least one bit for indicating whether the MAC frame header adopts an optimized MAC frame header format, the optimized MAC frame header format referring to a MAC frame header format in which only necessary frame header information is reserved (or the optimized MAC frame header format referring to a compressed MAC frame header format); and the sending component 114 is coupled to the setting component 112 and is configured to send the MAC frame to a receiving station.

Figure 12:
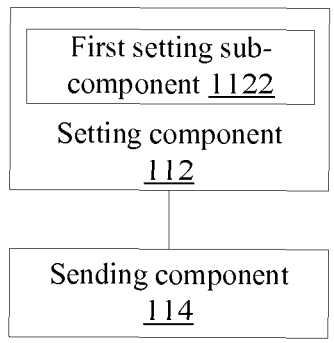
FIG. 12 is structural block diagram one of a device for transmitting a frame in a network according to an example embodiment of the present disclosure.

FIG. 12 is structural block diagram one of a device for transmitting a frame in a network according to an example embodiment of the present disclosure. As shown in FIG. 12, the setting component includes: a first setting sub-component 1122 configured to set, in a case where the at least one bit is a local network identity identification/reservation duration field in the MAC frame header, a value of the at least one bit to be within a value interval of local network identity identification, wherein the local network identity identification/reservation duration field is used for indicating local network identity identification information about one station in the optimized MAC frame header format and is used for indicating information about one reservation duration in a non-optimized MAC frame header format, and the value interval of the local network identity identification does not overlap with a value interval of the reservation duration information in the local network identity identification/reservation duration field.

Figure 13:
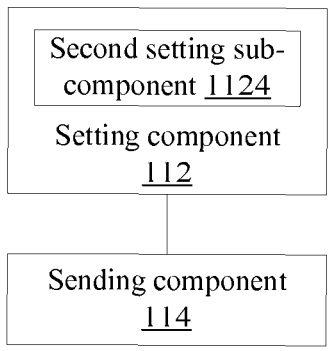
FIG. 13 is structural block diagram two of a device for transmitting a frame in a network according to an example embodiment of the present disclosure.

FIG. 13 is structural block diagram two of a device for transmitting a frame in a network according to an example embodiment of the present disclosure. As shown in FIG. 13, the setting component further includes: a second setting sub-component 1124 configured to set, in a case where the at least one bit is a frame type and/or frame sub-type in the MAC frame header, the value of the at least one bit to be a preset value for indicating that the MAC frame header adopts the optimized MAC frame header format and set a value of a local network identity identification/reservation duration field in the MAC frame header to be within a value interval of local network identity identification, wherein the local network identity identification/reservation duration field is used for indicating local network identity identification information about one station in the optimized MAC frame header format and is used for indicating information about one reservation duration in a non-optimized MAC frame header format, the value interval of the local network identity identification does not overlap with a value interval of the reservation duration information in the local network identity identification/reservation duration field.

Figure 14:
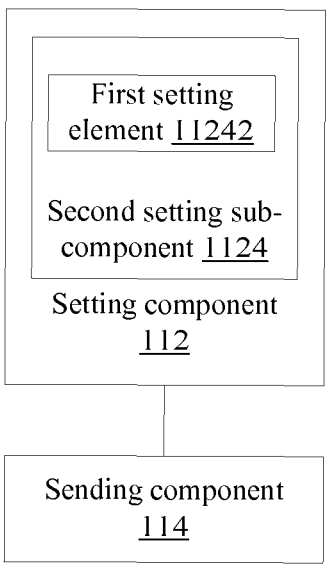
FIG. 14 is structural block diagram three of a device for transmitting a frame in a network according to an example embodiment of the present disclosure.

FIG. 14 is structural block diagram three of a device for transmitting a frame in a network according to an example embodiment of the present disclosure. As shown in FIG. 14, the second setting sub-component 1124 includes: a first setting element 11242 configured to set the value of the local network identity identification/reservation duration field in the MAC frame header to be the local network identity identification of the sending station of the MAC frame, and use one unique address identification information field to indicate the MAC address of the receiving station of the MAC frame.

Figure 15:
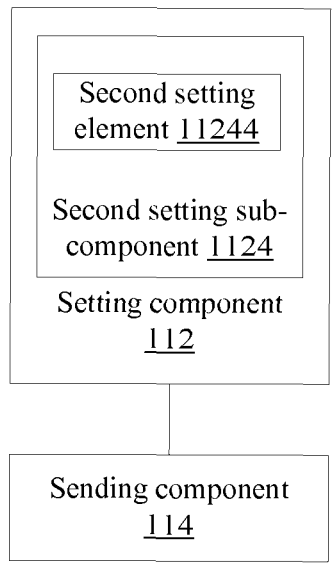
FIG. 15 is structural block diagram four of a device for transmitting a frame in a network according to an example embodiment of the present disclosure.

FIG. 15 is structural block diagram four of a device for transmitting a frame in a network according to an example embodiment of the present disclosure. As shown in FIG. 15, the second setting sub-component 1124 further includes: a second setting element 11244 configured to set the value of the local network identity identification/reservation duration field in the MAC frame header to be the local network identity identification of the receiving station of the MAC frame, and use one unique address identification information field to indicate the MAC address of the sending station of the MAC frame.

Figure 16:
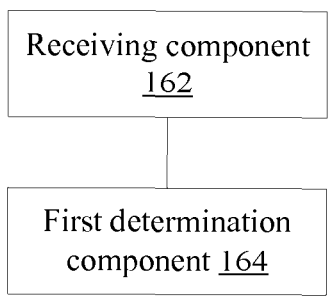
FIG. 16 is structural block diagram two of a device for transmitting a frame in a network according to an embodiment of the present disclosure.

FIG. 16 is structural block diagram two of the device for transmitting a frame in a network according to an embodiment of the present disclosure. As shown in FIG. 16, the device includes a receiving component 162 and a first determination component 164. The structure thereof is described in details below.

The receiving component 162 is configured to receive a MAC frame from a sending station, wherein the MAC frame header of the MAC frame includes at least one bit for indicating whether the MAC frame header adopts an optimized MAC frame header format, the optimized MAC frame header format referring to a MAC frame header format in which only necessary frame header information is reserved (or the optimized MAC frame header format referring to a compressed MAC frame header format); and the first determination component 164 is coupled to the receiving component 162 and is configured to determine that the MAC frame header adopts the optimized MAC frame header format according to the at least one bit.

Figure 17:
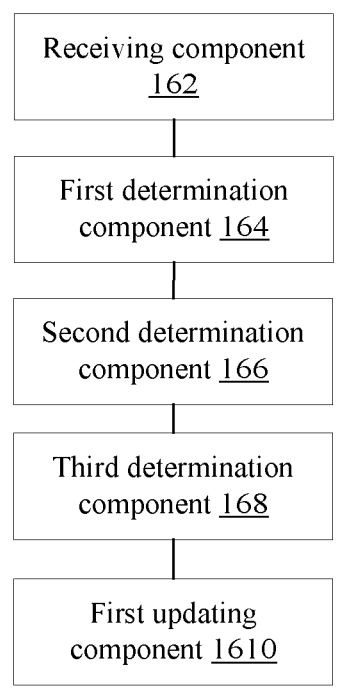
FIG. 17 is structural block diagram five of a device for transmitting a frame in a network according to an example embodiment of the present disclosure.

FIG. 17 is structural block diagram five of a device for transmitting a frame in a network according to an example embodiment of the present disclosure. As shown in FIG. 17, the above-mentioned device further includes: a second determination component 166 configured to determine, in a case where a value of a local network identity identification/reservation duration field in the MAC frame header is local network identity identification of the sending station of the MAC frame and one unique address identification information field is used to indicate a MAC address of the receiving station of the MAC frame, that a MAC address of the receiving station is inconsistent with the MAC address of the receiving station of the MAC frame indicated by the unique address identification information field; a third determination component 168 coupled to the second determination component 166 and configured to determine that a time length of one interframe space plus a transmission time of one acknowledgement frame is greater than a value of a network allocation vector having been set by the receiving station; and a first updating component 1610 coupled to the third determination component 168 and configured to update the value of the network allocation vector in accordance with the time length of one interframe space plus the transmission time of one acknowledgement frame.

Figure 18:
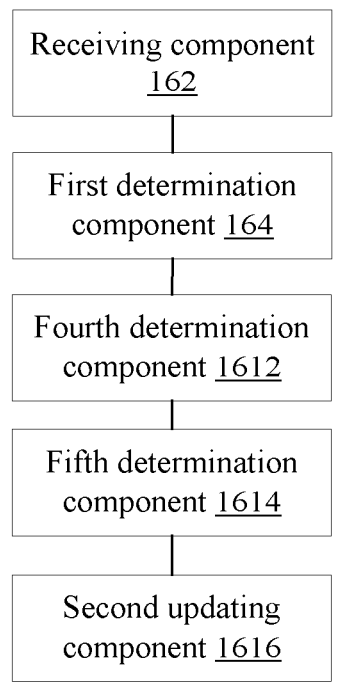
FIG. 18 is structural block diagram six of a device for transmitting a frame in a network according to an example embodiment of the present disclosure.

FIG. 18 is structural block diagram six of a device for transmitting a frame in a network according to an example embodiment of the present disclosure. As shown in FIG. 18, the above-mentioned device further includes: a fourth determination component 1612 configured to determine, in a case where the value of the local network identity identification/reservation duration field in the MAC frame header is local network identity identification of the receiving station of the MAC frame and one unique address identification information field is used to indicate a MAC address of the sending station of the MAC frame, that local network identity identification corresponding to the MAC address of the receiving station is inconsistent with the value of the local network identity identification/reservation duration field in the MAC frame header; a fifth determination component 1614 coupled to the fourth determination component 1612 and configured to determine that a time length of one interframe space plus a transmission time of one acknowledgement frame is greater than a value of a network allocation vector having been set by the receiving station; and a second updating component 1616 coupled to the fifth determination component 1614 and configured to update the value of the network allocation vector in accordance with the time length of one interframe space plus the transmission time of one acknowledgement frame.

It should be noted that the device for transmitting a frame in a network described in the device embodiments corresponds to the above-mentioned method embodiments, with the specific implementation described in the method embodiment in detail, thereby needing no further description.

In summary, according to the above-mentioned embodiments of the present disclosure, provided are methods and devices for transmitting a frame in a network. By means of the solutions provided in the embodiments of the present disclosure, the frame header can adopt an optimized MAC frame header in which only necessary frame header information is reserved, and this not only can ensure the correct receiving and sending of the frame but also can effectively reduce the frame overhead.

Obviously, those skilled in the art shall understand that the above-mentioned components and steps of the disclosure can be realized by using general purpose calculating device, can be integrated in one calculating device or distributed on a network which consists of a plurality of calculating devices. Alternatively, the components and the steps of the disclosure can be realized by using the executable program code of the calculating device. Consequently, they can be stored in the storing device and executed by the calculating device, or they are made into integrated circuit component respectively, or a plurality of components or steps thereof are made into one integrated circuit component. In this way, the disclosure is not restricted to any particular hardware and software combination.

The descriptions above are only the preferable embodiment of the disclosure, which are not used to restrict the disclosure, for those skilled in the art, the disclosure may have various changes and variations. Any amendments, equivalent substitutions, improvements, etc. within the principle of the present disclosure should be all included in the scope of the protection defined by the claims of the present disclosure.

What is claimed is:

1. A method for transmitting a frame in a network, comprising:
    setting, by a sending station, a media access control (MAC) frame header of a MAC frame, wherein the MAC frame header comprises at least one bit for indicating whether the MAC frame header adopts an optimized MAC frame header format, the optimized MAC frame header format referring to a MAC frame header format in which only necessary frame header information is reserved or referring to a compressed MAC frame header format; and
    sending, by the sending station, the MAC frame to a receiving station;
    wherein setting, by the sending station, the MAC frame header of the MAC frame comprises:
    in a case where the at least one bit is a local network identity identification/reservation duration field in the MAC frame header, setting a value of the at least one bit to be within a value interval of local network identity identification, wherein the local network identity identification/reservation duration field is used for indicating local network identity identification information about one station in the optimized MAC frame header format and is used for indicating information about one reservation duration in a non-optimized MAC frame header format, and the value interval of the local network identity identification does not overlap with a value interval of the reservation duration information in the local network identity identification/reservation duration field; or,
    in a case where the at least one bit is a frame type and/or frame sub-type in the MAC frame header, setting a value of the at least one bit to be a preset value for indicating that the MAC frame header adopts the optimized MAC frame header format, and setting a value of a local network identity identification/reservation duration field in the MAC frame header to be within a value interval of local network identity identification, wherein the local network identity identification/reservation duration field is used for indicating local network identity identification information about one station in the optimized MAC frame header format and is used for indicating information about one reservation duration in a non-optimized MAC frame header format, the value interval of the local network identity identification does not overlap with a value interval of the reservation duration information in the local network identity identification/reservation duration field.

2. The method according to claim 1, wherein setting the value of the at least one bit to be within the value interval of the local network identity identification comprises: setting the value of the at least one bit to be the local network identity identification of the sending station of the MAC frame, and using one unique address identification information field to indicate a MAC address of the receiving station of the MAC frame.

3. The method according to claim 1, wherein setting the value of the at least one bit to be within the value interval of the local network identity identification comprises: setting the value of the at least one bit to be the local network identity identification of the receiving station of the MAC frame, and using one unique address identification information field to indicate a MAC address of the sending station of the MAC frame.

4. The method according to claim 1, wherein setting the value of the local network identity identification/reservation duration field in the MAC frame header to be within the value interval of the local network identity identification comprises: setting the value of the local network identity identification/reservation duration field in the MAC frame header to be the local network identity identification of the sending station of the MAC frame, and using one unique address identification information field to indicate a MAC address of the receiving station of the MAC frame.

5. The method according to claim 1, wherein setting the value of the local network identity identification/reservation duration field in the MAC frame header to be within the value interval of the local network identity identification comprises: setting the value of the local network identity identification/reservation duration field in the MAC frame header to be the local network identity identification of the receiving station of the MAC frame, and using one unique address identification information field to indicate a MAC address of the sending station of the MAC frame.

6. A method for transmitting a frame in a network, comprising:
receiving, by a receiving station, a media access control (MAC) frame from a sending station, wherein a MAC frame header of the MAC frame comprises at least one bit for indicating whether the MAC frame header adopts an optimized MAC frame header format, the optimized MAC frame header format referring to a MAC frame header format in which only necessary frame header information is reserved or referring to a compressed MAC frame header format; and
determining, by the receiving station, that the MAC frame header adopts the optimized MAC frame header format according to the at least one bit;
wherein, the MAC frame is set by the sending station according to the following manner:
in a case where the at least one bit is a local network identity identification/reservation duration field in the MAC frame header, setting a value of the at least one bit to be within a value interval of local network identity identification, wherein the local network identity identification/reservation duration field is used for indicating local network identity identification information about one station in the optimized MAC frame header format and is used for indicating information about one reservation duration in a non-optimized MAC frame header format, and the value interval of the local network identity identification does not overlap with a value interval of the reservation duration information in the local network identity identification/reservation duration field; or,
in a case where the at least one bit is a frame type and/or frame sub-type in the MAC frame header, setting a value of the at least one bit to be a preset value for indicating that the MAC frame header adopts the optimized MAC frame header format, and setting a value of a local network identity identification/reservation duration field in the MAC frame header to be within a value interval of local network identity identification, wherein the local network identity identification/reservation duration field is used for indicating local network identity identification information about one station in the optimized MAC frame header format and is used for indicating information about one reservation duration in a non-optimized MAC frame header format, the value interval of the local network identity identification does not overlap with a value interval of the reservation duration information in the local network identity identification/reservation duration field.

7. The method according to claim 6, wherein after determining, by the receiving station, that the MAC frame header adopts the optimized MAC frame header format according to the at least one bit, the method further comprises:
in a case where a value of a local network identity identification/reservation duration field in the MAC frame header is local network identity identification of the sending station of the MAC frame and one unique address identification information field is used to indicate a MAC address of the receiving station of the MAC frame, determining, by the receiving station, that a MAC address of the receiving station is inconsistent with the MAC address of the receiving station of the MAC frame indicated by the unique address identification information field;
determining, by the receiving station, that a time length of one interframe space plus a transmission time of one acknowledgement frame is greater than a value of a network allocation vector having been set by the receiving station; and
updating, by the receiving station, the value of the network allocation vector in accordance with the time length of one interframe space plus the transmission time of one acknowledgement frame.

8. The method according to claim 6, wherein after determining, by the receiving station, that the MAC frame header adopts the optimized MAC frame header format according to the at least one bit, the method further comprises:
in a case where a value of a local network identity identification/reservation duration field in the MAC frame header is local network identity identification of the receiving station of the MAC frame and one unique address identification information field is used to indicate a MAC address of the sending station of the MAC frame, determining, by the receiving station, that local network identity identification corresponding to the MAC address of the receiving station is inconsistent with the value of the local network identity identification/reservation duration field in the MAC frame header;
determining, by the receiving station, that a time length of one interframe space plus a transmission time of one acknowledgement frame is greater than a value of a network allocation vector having been set by the receiving station; and
updating, by the receiving station, the value of the network allocation vector in accordance with the time length of one interframe space plus the transmission time of one acknowledgement frame.

9. A device for transmitting a frame in a network, comprising a hardware processor, configured to perform programming components stored in a memory, wherein the programming components comprise:

a setting component configured to set a media access control (MAC) frame header of a MAC frame, wherein the MAC frame header comprises at least one bit for indicating whether the MAC frame header adopts an optimized MAC frame header format, the optimized MAC frame header format referring to a MAC frame header format in which only necessary frame header information is reserved or referring to a compressed MAC frame header format; and a sending component configured to send the MAC frame to a receiving station;

wherein the setting component comprises:

a first setting sub-component configured to set, in a case where the at least one bit is a local network identity identification/reservation duration field in the MAC frame header, a value of the at least one bit to be within a value interval of local network identity identification, wherein the local network identity identification/reservation duration field is used for indicating local network identity identification information about one station in the optimized MAC frame header format and is used for indicating information about one reservation duration in a non-optimized MAC frame header format, and the value interval of the local network identity identification does not overlap with a value interval of the reservation duration information in the local network identity identification/reservation duration field; or, a second setting sub-component configured to set, in a case where the at least one bit is a frame type and/or frame sub-type in the MAC frame header, a value of the at least one bit to be a preset value for indicating that the MAC frame header adopts the optimized MAC frame header format, and set a value of a local network identity identification/reservation duration field in the MAC frame header to be within a value interval of local network identity identification, wherein the local network identity identification/reservation duration field is used for indicating local network identity identification information about one station in the optimized MAC frame header format and is used for indicating information about one reservation duration in a non-optimized MAC frame header format, the value interval of the local network identity identification does not overlap with a value interval of the reservation duration information in the local network identity identification/reservation duration field.

10. A device for transmitting a frame in a network, comprising a hardware processor, configured to perform programming components stored in a memory, wherein the programming components comprise:

a receiving component configured to receive a media access control (MAC) frame from a sending station, wherein a MAC frame header of the MAC frame comprises at least one bit for indicating whether the MAC frame header adopts an optimized MAC frame header format, the optimized MAC frame header format referring to a MAC frame header format in which only necessary frame header information is reserved or referring to a compressed MAC frame header format; and a first determination component configured to determine that the MAC frame header adopts the optimized MAC frame header format according to the at least one bit;

wherein, the MAC frame is set by the sending station according to the following manner:

in a case where the at least one bit is a local network identity identification/reservation duration field in the MAC frame header, setting a value of the at least one bit to be within a value interval of local network identity identification, wherein the local network identity identification/reservation duration field is used for indicating local network identity identification information about one station in the optimized MAC frame header format and is used for indicating information about one reservation duration in a non-optimized MAC frame header format, and the value interval of the local network identity identification does not overlap with a value interval of the reservation duration information in the local network identity identification/reservation duration field; or, in a case where the at least one bit is a frame type and/or frame sub-type in the MAC frame header, setting a value of the at least one bit to be a preset value for indicating that the MAC frame header adopts the optimized MAC frame header format, and setting a value of a local network identity identification/reservation duration field in the MAC frame header to be within a value interval of local network identity identification, wherein the local network identity identification/reservation duration field is used for indicating local network identity identification information about one station in the optimized MAC frame header format and is used for indicating information about one reservation duration in a non-optimized MAC frame header format, the value interval of the local network identity identification does not overlap with a value interval of the reservation duration information in the local network identity identification/reservation duration field.

11. The device according to claim 10, wherein the programming components further comprise:

a second determination component configured to determine, in a case where a value of a local network identity identification/reservation duration field in the MAC frame header is local network identity identification of the sending station of the MAC frame and one unique address identification information field is used to indicate a MAC address of the receiving station of the MAC frame, that a MAC address of the receiving station is inconsistent with the MAC address of the receiving station of the MAC frame indicated by the unique address identification information field;

a third determination component configured to determine that a time length of one interframe space plus a transmission time of one acknowledgement frame is greater than a value of a network allocation vector having been set by the receiving station; and a first updating component configured to update the value of the network allocation vector in accordance with the time length of one interframe space plus the transmission time of one acknowledgement frame.

12. The device according to claim 10, wherein the programming components further comprise:

a fourth determination component configured to determine, in a case where a value of a local network identity identification/reservation duration field in the MAC frame header is local network identity identification of the receiving station of the MAC frame and one unique address identification information field is used to indicate a MAC address of the sending station of the MAC frame, that local network identity identification corresponding to the MAC address of the receiving station is inconsistent with the value of the local network identity identification/reservation duration field in the MAC frame header;

a fifth determination component configured to determine that a time length of one interframe space plus a transmission time of one acknowledgement frame is greater than a value of a network allocation vector having been set by the receiving station; and a second updating component configured to update the value of the network allocation vector in accordance with the time length of one interframe space plus the transmission time of one acknowledgement frame.

* * * * *